(12) United States Patent
Liu

(10) Patent No.: US 11,116,037 B2
(45) Date of Patent: Sep. 7, 2021

(54) DATA TRANSMISSION METHOD AND RELATED PRODUCT

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/714,997

(22) Filed: Dec. 16, 2019

(65) Prior Publication Data

US 2020/0337112 A1 Oct. 22, 2020

Related U.S. Application Data

(63) Continuation of application No. PCT/CN2017/097183, filed on Aug. 11, 2017.

(51) Int. Cl.
*H04W 80/02* (2009.01)
*H04L 29/06* (2006.01)
*H04W 28/06* (2009.01)

(52) U.S. Cl.
CPC ............ *H04W 80/02* (2013.01); *H04L 69/22* (2013.01); *H04W 28/06* (2013.01)

(58) Field of Classification Search
CPC ........ H04W 28/06; H04W 80/02; H04L 69/22
See application file for complete search history.

(56) References Cited

U.S. PATENT DOCUMENTS 9,479,957 B2 10/2016 Lee et al.
2009/0092076 A1 4/2009 Zheng et al.
(Continued)

FOREIGN PATENT DOCUMENTS

CN 101803333 A 8/2010
CN 101867871 A 10/2010
(Continued)

OTHER PUBLICATIONS

The EESR of corresponding European application No. 17921391.3, dated Mar. 18, 2020.
(Continued)

*Primary Examiner* — Jamal Javaid
*Assistant Examiner* — Ryan C Kavleski

(57) ABSTRACT

Embodiments of the present application disclose a data transmission method and a related product. The method includes: a receiving end receives a data packet from a transmitting end, where the data packet includes a media access control MAC protocol data unit PDU, and the MAC PDU includes multiple MAC subPDUs, each of which includes an MAC sub-header; where the MAC sub-header includes a first information field used for indicating whether a current MAC subPDU has a same format as a next adjacent MAC subPDU. The embodiments of the present application allow for incorporating a first information field into an existing MAC sub-header format, where the first information field may be used for dynamically indicating whether a current MAC subPDU has a same format as a next adjacent MAC subPDU, it is thus advantageous to improve data processing flexibility and efficiency at the receiving end.

17 Claims, 5 Drawing Sheets

(56) References Cited

U.S. PATENT DOCUMENTS

| | | | | |
|---|---|---|---|---|
| 2010/0278111 | A1* | 11/2010 | Kashima | H04W 28/065 370/328 |
| 2013/0039272 | A1 | 2/2013 | Chen | |
| 2015/0163689 | A1 | 6/2015 | Lee et al. | |
| 2017/0222871 | A1 | 8/2017 | Yu et al. | |
| 2018/0323936 | A1* | 11/2018 | Agiwal | H04W 28/065 |
| 2019/0132066 | A1* | 5/2019 | Park | H04W 36/0079 |

FOREIGN PATENT DOCUMENTS

| | | |
|---|---|---|
| CN | 101911630 A | 12/2010 |
| CN | 101911762 A | 12/2010 |
| CN | 101990245 A | 3/2011 |
| CN | 102111393 A | 6/2011 |
| CN | 104579541 A | 4/2015 |
| CN | 105874832 A | 8/2016 |
| EP | 2676477 A1 | 12/2013 |

OTHER PUBLICATIONS

OPPO; "Discussion on MAC sub-header", 3GPP DRAFT; R2-1704061_Discussion on MAC Sub-Header, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017(May 14, 2017), XP051274674.

The First Office Action of corresponding Chinese application No. 201780051012.9, dated Apr. 29, 2020.
3GPP TS 36.321 V8.9.0, Medium Access Control (MAC) protocol specification (Release 8), published on Jun. 30, 2010.
International Search Report (ISR) dated May 3, 2018 for Application No. PCT/CN2017/097189.
International Search Report (ISR) dated May 3, 2018 PCT/CN2017/097196.
International Search Report (ISR) dated May 2, 2018 PCT/CN2017/097183.
The EESR of corresponding European application No. 17921037.2, dated Jun. 26, 2020.
Ericsson: "Text proposal for MAC sub-header format", 3GPP Draft; R2-1707115—Text Proposal for MAC Sub-Header Format, 3rd Generation Partnership Project (3GPP), Mobile Competence Centre; 650, Route Des Lucioles; F-06921 Sophia-Antipolis Cedex; Franc, vol. RAN WG2, No. Qingdao; Jun. 27, 2017-Jun. 29, 2017 Jun. 26, 2017(Jun. 26, 2017), XP051301608.
Nokia et al: "LCID omitting for MAC PDU", 3GPP Draft; R2-1706585 LCID Omitting for MAC PDU, 3rd Generation Partnership Project (3GPP), Mobile Competence Centre; 650, Route Des Lucioles; F-06921 Sophia-Antipolis Cedex; France, vol. RAN WG2, No. Qingdao, China: Jun. 27, 2017-Jun. 29, 2017 Jun. 16, 2017(Jun. 16, 2017), XP051306508.
The second Office Action of corresponding Chinese application No. 201780051012.9, dated Oct. 27, 2019.
The first Office Action of corresponding European application No. 17921391.3, dated Nov. 20, 2020.
The Non-final rejection corresponding U.S. Appl. No. 16/726,525, dated Mar. 4, 2021.

* cited by examiner

DATA TRANSMISSION METHOD AND RELATED PRODUCT

CROSS-REFERENCE TO RELATED APPLICATIONS

This application is a continuation of the International Application No. PCT/CN2017/097183, filed on Aug. 11, 2017, the content of which is incorporated herein by reference in its entirety.

TECHNICAL FIELD

The present application relates to the field of communication technologies and, in particular, to a data transmission method and a related product.

BACKGROUND

Layer 2 (L2) protocol stacks defined in the $3^{rd}$ generation partnership project (3GPP) protocol include three logical levels—a packet data convergence protocol (PDCP), a radio link control (RLC) protocol, and a medium access control (MAC) protocol. Among them, functions such as user plane and control plane data transmission, encryption, integrity protection, and header compression are completed on the PDCP layer; functions such as size matching of data packets are completed on the RLC layer; functions such as data scheduling and mapping between a logical channel and a transport channel are completed on the MAC layer. A process flow of the entire L2 downlink protocol stack includes: a PDCP protocol data unit (PDU) consists of data on the PDCP layer plus a PDCP header, and is transmitted to the RLC layer; after a certain function is completed on the RLC layer, the received data is transmitted to the MAC layer together with a RLC header; and one or more MAC service data units (SDU) are multiplexed on the MAC layer to form an MAC PDU which is transmitted to a UE (User Equipment). Each MAC SDU corresponds to an MAC sub-header. One MAC PDU consists of one MAC header, none or one or more MAC SDUs, none or one or more MAC control elements, and possibly padding data. The padding data is supplementary data. When the amount of data on the RLC layer is smaller than actually scheduled resources, for the MAC, the MAC PDU needs to be patched at the end, that is, the padding data is supplemented. One MAC header consists of one or more MAC sub-headers, each of which is an MAC SDU or an MAC control element (MAC CE) or a sub-header corresponding to padding. Both the MAC header and the MAC SDU are of variable sizes.

SUMMARY

Embodiments of the present application provide a data transmission method and a related product, expecting to be advantageous to improve data processing flexibility and efficiency at a receiving end.

In a first aspect, an embodiment of the present application provides a data transmission method, including:
receiving, by a receiving end, a data packet from a transmitting end, where the data packet includes a media access control MAC protocol data unit PDU, and the MAC PDU includes multiple MAC subPDUs, each of which includes an MAC sub-header;
where the MAC sub-header includes a first information field used for indicating whether a current MAC subPDU has a same format as a next adjacent MAC subPDU.

In a second aspect, an embodiment of the present application provides a data transmission method, including:
transmitting, by a transmitting end, a data packet, where the data packet includes a medium access control MAC protocol data unit PDU, and the MAC PDU includes multiple MAC subPDUs, each of which includes an MAC sub-header.

In a third aspect, an embodiment of the present application provides a receiving device, where the receiving device has functions for implementing behaviors of a receiving device in the foregoing method design. The functions may be implemented by hardware or implemented by hardware executing corresponding software. The hardware or the software includes one or more modules corresponding to the functions described above. In a possible design, the receiving device includes a processor configured to support the receiving device to perform a corresponding function in the method described above. Further, the receiving device may further include a transceiver for supporting communications between the receiving device and a network device. Further, the receiving device may further include a memory coupling with the processor and stored with program instructions and data necessary for the receiving device.

In a fourth aspect, an embodiment of the present application provides a transmitting device, where the transmitting device has functions for implementing behaviors of a transmitting device in the foregoing method design. The functions may be implemented by hardware or implemented by hardware executing corresponding software. The hardware or the software includes one or more modules corresponding to the functions described above. In a possible design, the transmitting device includes a processor configured to support the transmitting device to perform a corresponding function in the method described above. Further, the transmitting device may further include a transceiver for supporting communications between the transmitting device and a terminal. Further, the transmitting device may further include a memory coupling with the processor and stored with program instructions and data necessary for the transmitting device.

In a fifth aspect, an embodiment of the present application provides a terminal including a processor, a memory, a communication interface, and one or more programs, where the one or more programs are stored in the memory and configured to be executed by the processor, and the program includes instructions for performing a step in any method according to the first aspect in the embodiment of the present application.

In a sixth aspect, an embodiment of the present application provides a network device including a processor, a memory; a transceiver, and one or more programs, where the one or more programs are stored in the memory and configured to be executed by the processor, and the program includes instructions for performing a step in any method according to the second aspect in the embodiment of the present application.

In a seventh aspect, an embodiment of the present application provides a computer readable storage medium having stored thereon a computer program for electronic data exchange, where the computer program causes a computer to perform part of or all of steps described in any method according to the first aspect in the embodiment of the present application.

In an eighth aspect, an embodiment of the present application provides a computer readable storage medium having stored thereon a computer program for electronic data exchange, where the computer program causes a computer to perform part of or all of steps described in any method according to the second aspect in the embodiment of the present application.

In a ninth aspect, an embodiment of the present application provides a computer program product including a non-transitory computer readable storage medium stored with a computer program, where the computer program is operable to cause a computer to perform part of or all of steps described in any method according to the first aspect in the embodiment of the present application. The computer program product may be a software installation package.

In a tenth aspect, an embodiment of the present application provides a computer program product including a non-transitory computer readable storage medium stored with a computer program, where the computer program is operable to cause a computer to perform part of or all of steps described in any method according to the second aspect in the embodiment of the present application. The computer program product may be a software installation package.

It can be seen that, in the embodiments of the present application, a receiving end receives a data packet from a transmitting end, since the data packet includes an MAC PDU, and the MAC PDU includes multiple MAC subPDUs, each of which includes an MAC sub-header; in addition, the MAC sub-header includes a first information field used for indicating whether a current MAC subPDU has a same format as a next adjacent MAC subPDU. The received MAC PDU can be flexibly processed by the receiving end according to specific information indicated in the first information field. Specifically, in a case where the first information field indicates that a current MAC subPDU has a same format as a next adjacent MAC subPDU, the receiving end does not need to repeatedly perform a format identification operation for the next adjacent MAC subPDU, so that the processing amount is integrally reduced, it is thus advantageous to improve data processing flexibility and efficiency at the receiving end.

BRIEF DESCRIPTION OF DRAWINGS

Accompanying drawings used for description of the embodiments or of the prior art will be briefly described hereunder.

DESCRIPTION OF EMBODIMENTS

Firstly, some concepts and conventional operation modes involved in the embodiments of the application will be briefly explained.

New Radio (NR) of the $5^{th}$ generation mobile communication technology (5G) is a newly proposed topic in the $3^{rd}$ Generation Partnership Project (3GPP) organization. As discussion of a new generation of 5G technology is deepened gradually, on one hand, because a communication system is backward compatible, the new technology developed subsequently tends to be compatible with the previously standardized technologies; on the other hand, because a 4G LTE system already has a large number of existing designs, in order to achieve compatibility, much flexibility in 5G needs to be sacrificed, and thus performance is reduced. Therefore, there are currently two parallel studies in the 3GPP organization, where a technical discussion group without consideration of backward compatibility is called 5G NR.

5G mainly has application scenarios of: enhanced Mobile Broadband (eMBB), Ultra-reliable and Low Latency Communications (URLLC), and massive machine type of communication (mMTC). Among them, eMBB still targets at users obtaining multimedia content, services and data, and its demand is growing rapidly. On the other hand, eMBB may be deployed in different scenarios, such as indoors, urban areas, and rural areas, resulting in a relatively large difference in capabilities and demands, so it cannot be treated in the same way and must be analyzed detailedly in conjunction with specific deployment scenarios. Typical applications for URLLC include: industrial automation, power automation, telemedicine operations (surgery), and traffic safety guarantee. Typical features of mMTC include: high connection density, a small data volume, delay-insensitive services, low costs and long service life of modules.

Technical solutions in the embodiments of the present application will be described hereunder with reference to the accompanying drawings.

Figure 1:
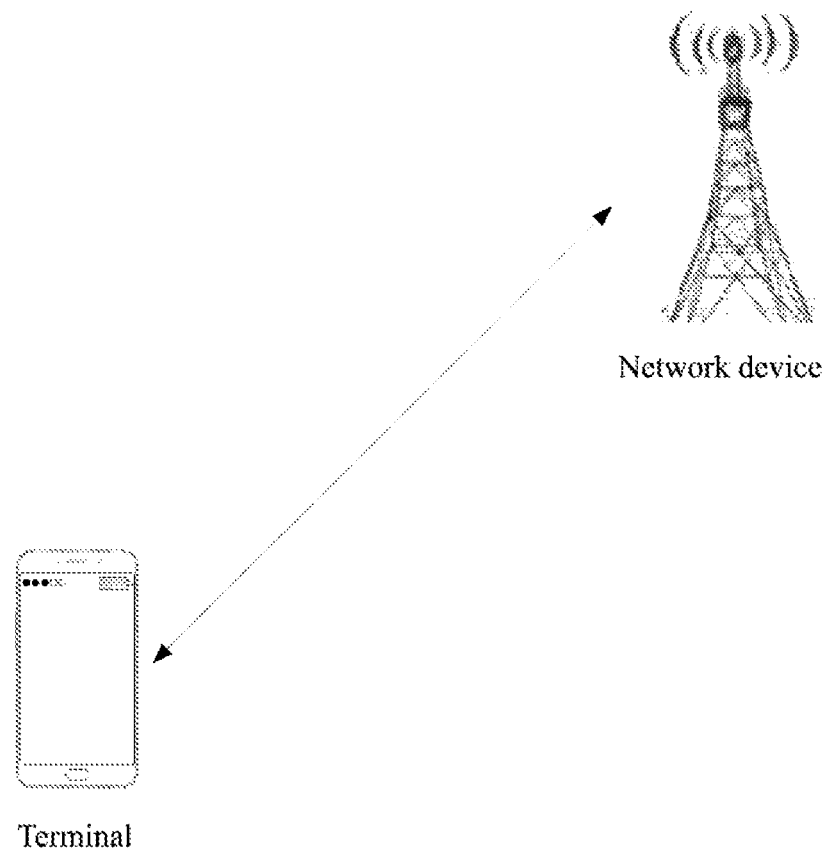
FIG. 1 is a network architecture diagram of a possible communication system according to an embodiment of the present application.

Reference may be made to FIG. 1. FIG. 1 is a possible network architecture of an example communication system according to an embodiment of the present application. The example communication system may be, for example, a 5GNR system and other such communication systems. The example communication system specifically includes a network device and a terminal. When the terminal accesses a mobile communication network provided by the network device, communication connection between the terminal and the network device may be implemented via a wireless link, and the communication connection mode may be a single connection mode or a dual connection mode or a multiple connection mode. When the communication connection mode is the single connection mode, the network device may be an LTE eNB or an NR gNB (also referred to as a gNB); when the communication mode is the dual connection mode (in particular, it may be implemented by a Carrier Aggregation (CA) technology; or implemented by multiple network devices), and the terminal is connected to multiple network devices, the multiple network devices may be a master base station MCG and a secondary base station SCG.

Data backhaul is performed between the base stations via a backhaul link. The primary base station may be an LTE eNB, and the secondary base station may be an LTE eNB; alternatively, the primary base station may be an NR gNB, and the secondary base station may be an LTE eNB; alternatively, the primary base station may be an NR gNB, and the secondary base station may be an NR gNB.

In the embodiments of the present application, terms such as "network" and "system" are usually used interchangeably, and those skilled in the art can understand meanings thereof. The terminal involved in the embodiments of the present application may include various handheld devices having wireless communication functions, vehicle-mounted devices, wearable devices, computing devices or other processing devices connected to a wireless modem, and various forms of user equipment (UE), mobile stations (MS), terminal devices, and the like. For ease of description, the devices mentioned above are collectively referred to as terminals.

Figure 2A:
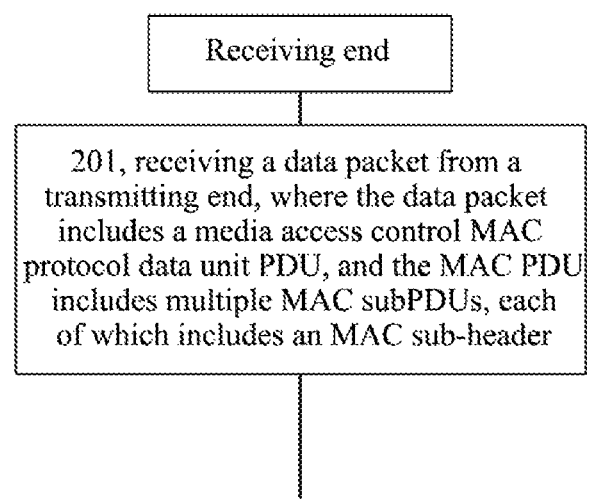
FIG. 2A is a schematic flowchart of a data transmission method according to an embodiment of the present application.

Reference may be made to FIG. 2A. FIG. 2A shows a data transmission method according to an embodiment of the present application, which is applied to the foregoing example communication system. The method includes:

At Section 201, a receiving end receives a data packet from a transmitting end, where the data packet includes a media access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

The transmitting end and the receiving end are devices with an MAC layer entity and a physical layer entity, where the MAC layer entity is used for assembly of an MAC PDU and delivers it to the physical layer entity, and it is then transmitted by the physical layer entity to the receiving end over an air interface; upon completion of the processing, the physical layer entity at the receiving end delivers the MAC PDU to the MAC layer entity at the receiving end, and an MAC header is then unpackaged by the MAC layer entity at the receiving end, that is, an information field is read.

In this possible example, the method further includes: in a case where the first information field indicates that a current MAC subPDU has a same format as a next adjacent MAC subPDU, the receiving end reads an information field of the next adjacent MAC subPDU according to the format of the current MAC subPDU, and the information field includes at least one of: the first information field, R field of extension bits, a logical channel identifier LCID field, F field indicating a bit length format, L field indicating a length, and a second information field.

It can be seen that, in the embodiment of the present application, a receiving end receives a data packet from a transmitting end, since the data packet includes an MAC PDU, and the MAC PDU includes multiple MAC subPDUs, each of which includes an MAC sub-header; in addition, the MAC sub-header includes a first information field used for indicating whether a current MAC subPDU has a same format as a next adjacent MAC subPDU. As such, the received MAC PDU can be flexibly processed by the receiving end according to specific information indicated in the first information field. Specifically, in a case where the first information field indicates that a current MAC subPDU has the same LCID field and L field as a next adjacent MAC subPDU, flexible indication is possible simply through the first information field, and no additional signaling or field is required to indicate this situation, it is thus advantageous to improve data processing flexibility and efficiency at the receiving end.

In a possible example, in the multiple MAC subPDUs, an MAC sub-header of an MAC subPDU without L field includes a second information field and a logical channel identifier LCID field, where the second information field is used for indicating whether the LCID field is read at the receiving end.

When the current MAC subPDU and the next MAC subPDU are from the same logical channel, the transmitting end can flexibly indicate, through the second information field, that there is no need for the receiving end to repeatedly read the LCID field of the next MAC subPDU.

It can be seen that, in this example, the receiving end can determine, according to the second information field, whether the LCID field needs to be read, thus additional processing capacity resulting from repeated reading is avoided when there is no need to read the information field, and it is then advantageous to reduce data processing overheads at the receiving end and improve data processing efficiency at the receiving end.

Figure 2B:
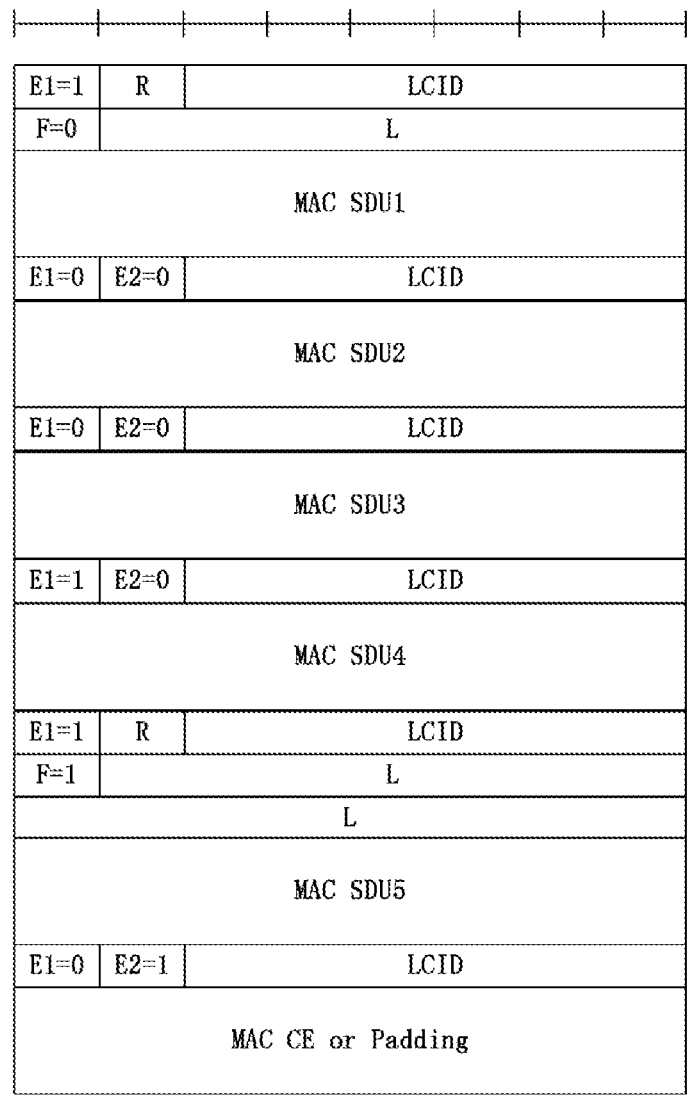
FIG. 2B is a schematic structural diagram of an MAC PDU according to an embodiment of the present application.

For example, as shown in FIG. 2B, it is assumed that the MAC PDU in the data packet includes 6 MAC subPDUs, among which MAC subSDU1 includes MAC sub-header1 and MAC SDU1, MAC subSDU2 includes MAC sub-header2 and MAC SDU2, MAC subSDU3 includes MAC sub-header3 and MAC SDU3, MAC subSDU4 includes MAC sub-header4 and MAC SDU4, MAC subSDU5 includes MAC sub-header5 and MAC SDU5, and MAC subSDU6 includes MAC sub-header6 and an MAC CE or padding. Moreover, the format of MAC SDU1 is different from that of MAC SDU2, and MAC sub-header1 of MAC SDU1 includes L field; MAC SDU2, MAC SDU3, and MAC SDU4 have the same format, and all corresponding MAC sub-headers do not include L field; MAC sub-header5 of MAC SDU5 includes L field; then a possible structure of the MAC PDU is as shown in FIG. 2B:

MAC sub-header1 has a format of E1/R/LCID/F/L, and E1=1, indicating that the format of MAC SDU1 is different from that of MAC SDU2;

MAC sub-header2 has a format of E1/E2/LCID, and E1=0, indicating that MAC SDU2 and MAC SDU3 have the same format, plus F2=0, indicating that the corresponding LCID is not read at the receiving end;

MAC sub-header3 has a format of E1/E2/LCID, and E1=0, indicating that MAC SDU3 and MAC SDU4 have the same format, plus E2=0, indicating that the corresponding LCID is not read at the receiving end;

MAC sub-header4 has a format of E1/E2/LCID, and E1=1, indicating that the format of MAC SDU4 is different from that of MAC SDU5, plus E2=0, indicating that the corresponding LCID is not read at the receiving end;

MAC sub-header5 has a format of E1/R/LCID/F/L, and E1=1, indicating that the format of MAC SDU5 is different from that of MAC SDU6;

MAC sub-header6 has a format of E1/E2/LCID, and E1=1, indicating that the format of MAC SDU6 is different from that of a next MAC subPDU, plus E2=1, indicating that the corresponding LCID is read at the receiving end;

where E1 represents a first information field, and E2 represents a second information field.

In a possible example, the second information field is located in a second bit of the MAC sub-header.

In a possible example, the first information field is located in a first bit of the MAC sub-header.

In a possible example, in the multiple MAC subPDUs, an MAC subPDU with L field has a bit length of 7 or 15 or 8 or 16 for the L field.

In a possible example, in the multiple MAC subPDUs, an MAC sub-header of an MAC subPDU with L field has a format of the first information field/R field of extension bits/the logical channel identifier LCID field/F field indicating a bit length format/L field indicating a length;

in the multiple MAC subPDUs, an MAC sub-header of an MAC subPDU without L field has a format of the first information field/the second information field/the LCID field.

In this possible example, the method further includes: in a case where the first information field indicates that a current MAC subPDU has a different format from a next adjacent MAC subPDU, the receiving end identifies whether the next adjacent MAC subPDU includes L field in order to determine the format of the MAC sub-header, where the MAC sub-header with L field has a format of the first information field/R field of extension bits/the logical channel identifier LCID field/F field indicating a bit length format/L field indicating a length; the MAC sub-header without L field has a format of the first information field/the second information field/the LCID field.

It can be seen that, in this example, since the format of the MAC sub-header is divided into two types depending on whether L field is included, the receiving end only needs to identify whether the current MAC sub-header includes L field, then the format type of the MAC sub-header can be accurately determined, and it is thus advantageous to improve accuracy for the receiving end to identify the MAC sub-header.

Figure 3:
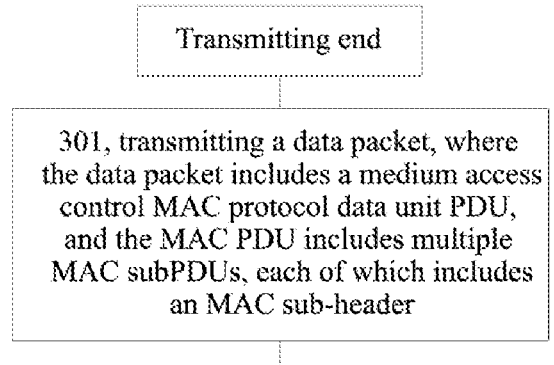
FIG. 3 is a schematic flowchart of another data transmission method according to an embodiment of the present application.

Reference may be made to FIG. 3. FIG. 3 shows a data transmission method according to an embodiment of the present application, which is applied to the foregoing example communication system. The method includes:

At Section 301, a transmitting end transmits a data packet, where the data packet includes a medium access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

It can be seen that, in the embodiment of the present application, a transmitting end transmits a data packet, since the data packet includes an MAC PDU, and the MAC PDU includes multiple MAC subPDUs, each of which includes an MAC sub-header; in addition, the MAC sub-header includes a first information field used for indicating whether a current MAC subPDU has a same format as a next adjacent MAC subPDU. As such, the received MAC PDU can be flexibly processed by the receiving end according to specific information indicated in the first information field. Specifically, in a case where the first information field indicates that a current MAC subPDU has the same LCID field and L field as a next adjacent MAC subPDU, flexible indication is possible simply through the first information field, and no additional signaling or field is required to indicate this situation, it is thus advantageous to improve data processing flexibility and efficiency at the receiving end.

In a possible example, in the multiple MAC subPDUs, an MAC sub-header of an MAC subPDU without L field includes a second information field and a logical channel identifier LCID field, where the second information field is used for indicating whether the LCID field is read at the receiving end.

In a possible example, the second information field is located in a second bit of the MAC sub-header.

In a possible example, the first information field is located in a first bit of the MAC sub-header.

In a possible example, in the multiple MAC subPDUs, an MAC subPDU with L field has a bit length of 7 or 15 or 8 or 16 for the L field.

In a possible example, in the multiple MAC subPDUs, an MAC sub-header of an MAC subPDU with L field has a format of the first information field/R field of extension bits/the logical channel identifier LCID field/F field indicating a bit length format/L field indicating a length;

in the multiple MAC subPDUs, an MAC sub-header of an MAC subPDU without L field has a format of the first information field/the second information field/the LCID field.

Figure 4:
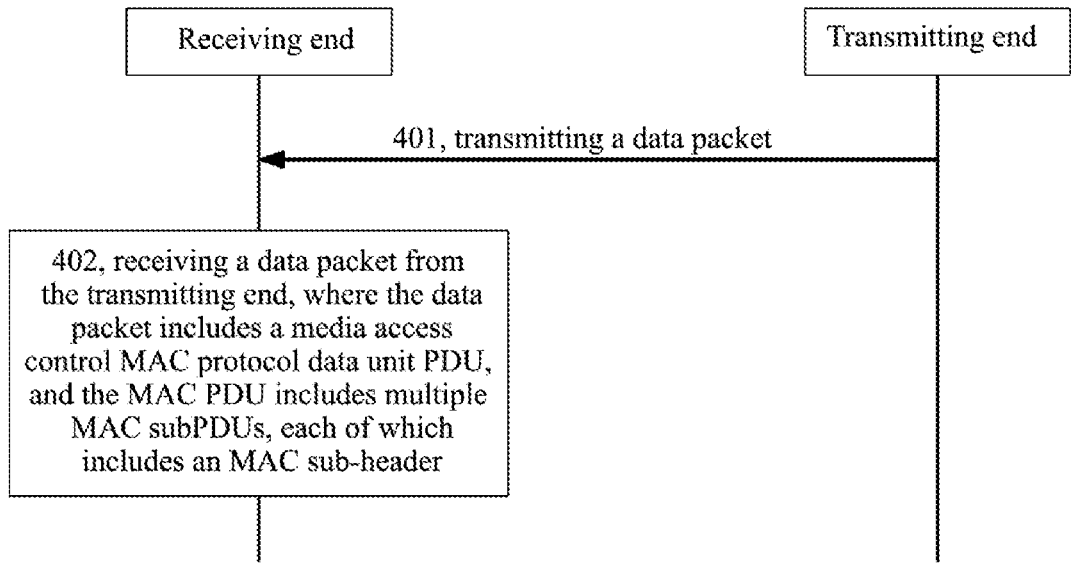
FIG. 4 is a schematic flowchart of another data transmission method according to an embodiment of the present application.

In compliance with the embodiments of FIG. 2A and FIG. 3, reference may be made to FIG. 4. FIG. 4 shows a data transmission method according to an embodiment of the present application, which is applied to the foregoing example communication system. The method includes:

At Section 401, a transmitting end transmits a data packet, where the data packet includes a medium access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

At Section 402, a receiving end receives a data packet from the transmitting end, where the data packet includes a media access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

It can be seen that, in the embodiment of the present application, since the data packet includes an MAC PDU, and the MAC PDU includes multiple MAC subPDUs, each of which includes an MAC sub-header; in addition, the MAC sub-header includes a first information field used for indicating whether a current MAC subPDU has a same format as a next adjacent MAC subPDU. As such, the received MAC PDU can be flexibly processed by the receiving end according to specific information indicated in the first information field. Specifically, in a case where the first information field indicates that a current MAC subPDU has the same LCID field and L field as a next adjacent MAC subPDU, flexible indication is possible simply through the first information field, and no additional signaling or field is required to indicate this situation, it is thus advantageous to improve data processing flexibility and efficiency at the receiving end.

Figure 5:
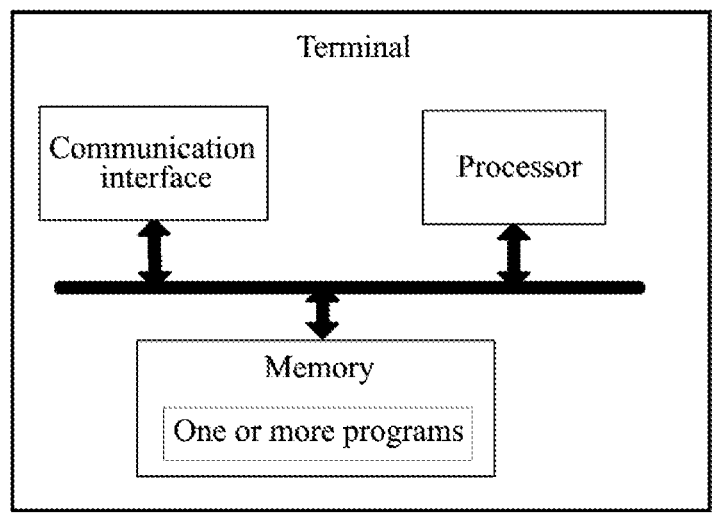
FIG. 5 is a schematic structural diagram of a terminal according to an embodiment of the present application.

In compliance with the foregoing embodiments, reference may be made to FIG. 5. FIG. 5 is a schematic structural diagram of a terminal according to an embodiment of the present disclosure. As shown in the figure, the terminal includes a processor, a memory, a communication interface, and one or more programs, where the one or more programs are stored in the memory and configured to be executed by the processor, and the program includes instructions for performing the following step:

Receiving a data packet from a transmitting end, where the data packet includes a medium access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

It can be seen that, in the embodiment of the present application, a receiving end receives a data packet from a transmitting end, since the data packet includes an MAC PDU, and the MAC PDU includes multiple MAC subPDUs, each of which includes an MAC sub-header; in addition, the MAC subheader includes a first information field used for indicating whether a current MAC subPDU has a same format as a next adjacent MAC subPDU. As such, the received MAC PDU can be flexibly processed by the receiving end according to specific information indicated in the first information field. Specifically, in a case where the first information field indicates that a current MAC subPDU has the same LCID field and L field as a next adjacent MAC subPDU, flexible indication is possible simply through the first information field, and no additional signaling or field is required to indicate this situation, it is thus advantageous to improve data processing flexibility and efficiency at the receiving end.

In a possible example, in the multiple MAC subPDUs, an MAC sub-header of an MAC subPDU without L field includes a second information field and a logical channel identifier LCID field, where the second information field is used for indicating whether the LCID field is read at the receiving end.

In a possible example, the second information field is located in a second bit of the MAC sub-header.

In a possible example, the first information field is located in a first bit of the MAC sub-header.

In a possible example, in the multiple MAC subPDUs, an MAC subPDU with L field has a bit length of 7 or 15 or 8 or 16 for the L field.

In a possible example, in the multiple MAC subPDUs, an MAC sub-header of an MAC subPDU with L field has a format of the first information field/R field of extension bits/the logical channel identifier LCID field/F field indicating a bit length format/L field indicating a length;

in the multiple MAC subPDUs, an MAC sub-header of an MAC subPDU without L field has a format of the first information field/the second information field/the LCID field.

Figure 6:
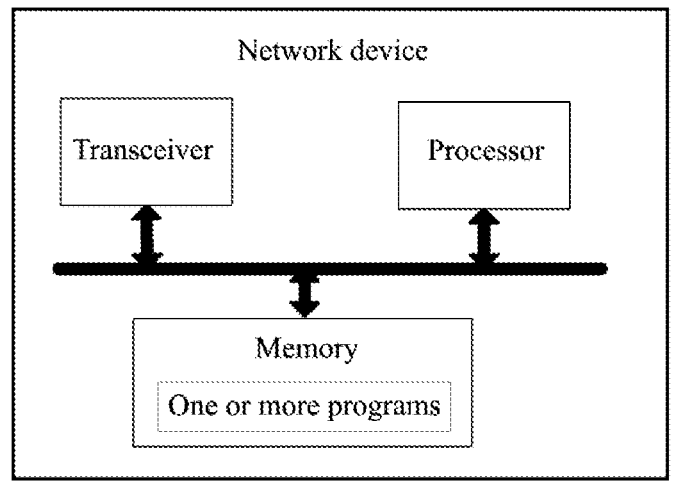
FIG. 6 is a schematic structural diagram of a network device according to an embodiment of the present application.

In compliance with the foregoing embodiments, reference may be made to FIG. 6. FIG. 6 is a schematic structural diagram of a network device according to an embodiment of the present disclosure. As shown in the figure, the network device includes a processor, a memory, a transceiver, and one or more programs, where the one or more programs are stored in the memory and configured to be executed by the processor, and the program includes instructions for performing the following step:

Transmitting a data packet, where the data packet includes a medium access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

It can be seen that, in the embodiment of the present application, a transmitting end transmits a data packet, since the data packet includes an MAC PDU, and the MAC PDU includes multiple MAC subPDUs, each of which includes an MAC sub-header; in addition, the MAC sub-header includes a first information field used for indicating whether a current MAC subPDU has a same format as a next adjacent MAC subPDU. As such, the received MAC PDU can be flexibly processed by the receiving end according to specific information indicated in the first information field. Specifically, in a case where the first information field indicates that a current MAC subPDU has the same LCID field and L field as a next adjacent MAC subPDU, flexible indication is possible simply through the first information field, and no additional signaling or field is required to indicate this situation, it is thus advantageous to improve data processing flexibility and efficiency at the receiving end.

In a possible example, in the multiple MAC subPDUs, an MAC sub-header of an MAC subPDU without L field includes a second information field and a logical channel identifier LCID field, where the second information field is used for indicating whether the LCID field is read at the receiving end.

In a possible example, the second information field is located in a second bit of the MAC sub-header.

In a possible example, the first information field is located in a first bit of the MAC sub-header.

In a possible example, in the multiple MAC subPDUs, an MAC subPDU with L field has a bit length of 7 or 15 or 8 or 16 for the L field.

In a possible example, in the multiple MAC subPDUs, an MAC sub-header of an MAC subPDU with L field has a format of the first information field/R field of extension bits/the logical channel identifier LCID field/F field indicating a bit length format/L field indicating a length;

in the multiple MAC subPDUs, an MAC sub-header of an MAC subPDU without L field has a format of the first information field/the second information field/the LCID field.

The solutions in the embodiments of the present application are described above mainly from a perspective of interaction between network elements. It can be understood that, in order to implement the above functions, the terminal and the network device include corresponding hardware structures and/or software modules for performing the respective functions. It should be known to persons skilled in the art that, the units and the algorithm steps of each example that are described with reference to the embodiments disclosed herein may be implemented in the present application by hardware or a combination of hardware and computer software. The situation that a certain function is performed by hardware or computer software driving hardware depends on specific applications and design constraints of the technical solutions. Persons skilled in the art may implement the described functions by using different methods for each specific application, but such implementation should not be regarded as going beyond the scope of the present application.

In the embodiments of the present application, functional units of the terminal and the network device may be divided according to the foregoing method examples. For example, the functional units may be divided according to corresponding functions, or two or more functions may be integrated into one processing unit. The above integrated unit may be implemented in a form of hardware or in a form of software program module. It should be noted that the division of the units in the embodiments of the present application is exemplary, and is only a division of logical functions. In an actual implementation, there may be another division manner.

Figure 7:
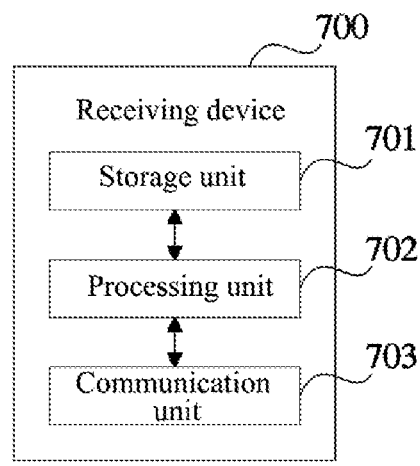
FIG. 7 is a block diagram showing a functional unit configuration of a terminal according to an embodiment of the present application.

With an integrated unit, FIG. 7 shows a block diagram of a possible functional unit configuration of a receiving device involved in the above embodiments. The receiving device 700 includes a processing unit 702 and a communication unit 703. The processing unit 702 is configured to control and manage actions of the receiving device. For example, the processing unit 702 is configured to support the receiving device to perform Step 201 in FIG. 2A, Step 402 in FIG. 4, and/or other processes of the technique described herein. The communication unit 703 is configured to support communications between the receiving device and a further device, such as communications between the receiving device and the network device shown in FIG. 6. The receiving device may further include a storage unit 701 for storing program codes and data of the receiving device.

The processing unit 702 may be a processor or a controller, such as a central processing unit (CPU), a general-purpose processor, a digital signal processor (DSP), an application-specific integrated circuit (ASIC), a field programmable gate array (FPGA) or other programmable logic device, transistor logic device, hardware component, or any combination thereof. It may implement or execute various exemplary logical blocks, modules and circuits described in conjunction with the present disclosure. The processor may also be a combination for implementing computing functions, for example, including one or more microprocessor combinations, a combination of the DSP and the microprocessor, and the like. The communication unit 703 may be a transceiver, a transceiver circuit, or the like. The storage unit 701 may be a memory.

The processing unit 702 is configured to receive a data packet from a transmitting end through the communication unit 703, where the data packet includes a media access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

In a possible example, in the multiple MAC subPDUs, an MAC sub-header of an MAC subPDU without L field includes a second information field and a logical channel identifier LCID field, where the second information field is used for indicating whether the LCID field is read at the receiving end.

In a possible example, the second information field is located in a second bit of the MAC sub-header.

In a possible example, the first information field is located in a first bit of the MAC sub-header.

In a possible example, in the multiple MAC subPDUs, an MAC subPDU with L field has a bit length of 7 or 15 or 8 or 16 for the L field.

In a possible example, in the multiple MAC subPDUs, an MAC sub-header of an MAC subPDU with L field has a format of the first information fielder field of extension bits/the logical channel identifier LCID field/F field indicating a bit length format/L field indicating a length;

in the multiple MAC subPDUs, an MAC sub-header of an MAC subPDU without L field has a format of the first information field/the second information field/the LCID field.

When the processing unit 702 is a processor, the communication unit 703 is a communication interface, and the storage unit 701 is a memory, the receiving device involved in the embodiment of the present application may be the terminal shown in FIG. 5.

Figure 8:
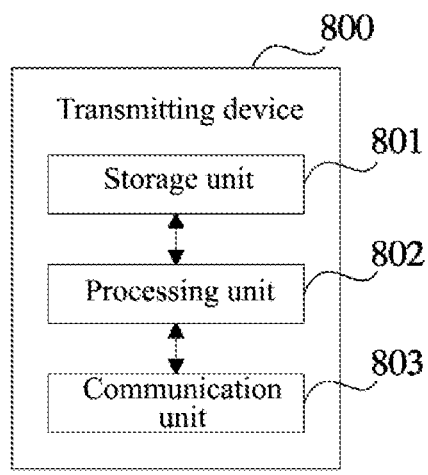
FIG. 8 is a block diagram showing a functional unit configuration of a network device according to an embodiment of the present application.

With an integrated unit, FIG. 8 shows a block diagram of a possible functional unit configuration of a transmitting device involved in the above embodiments. The transmitting device 800 includes a processing unit 802 and a communication unit 803. The processing unit 802 is configured to control and manage actions of the transmitting device. For example, the processing unit 802 is configured to support the transmitting device to perform Step 301 in FIG. 3, Step 401 in FIG. 4, and/or other processes of the technique described herein. The communication unit 803 is configured to support communications between the transmitting device and a further device, such as communications between the transmitting device and the terminal shown in FIG. 5. The transmitting device may further include a storage unit 801 for storing program codes and data of the transmitting device.

The processing unit 802 may be a processor or a controller, the communication unit 803 may be a transceiver, a transceiver circuit, a radio frequency chip, or the like. The storage unit 801 may be a memory.

The processing unit 802 is configured to transmit a data packet through the communication unit 803, where the data packet includes a media access control MAC protocol data unit PDU, and the MAC PDU includes multiple MAC subPDUs, each of which includes an MAC sub-header;

where the MAC sub-header includes a first information field used for indicating whether a current MAC subPDU has a same format as a next adjacent MAC subPDU.

In a possible example, in the multiple MAC subPDUs, an MAC sub-header of an MAC subPDU without L field includes a second information field and a logical channel identifier LCID field, where the second information field is used for indicating whether the LCID field is read at the receiving end.

In a possible example, the second information field is located in a second bit of the MAC sub-header.

In a possible example, the first information field is located in a first bit of the MAC sub-header.

In a possible example, in the multiple MAC subPDUs, an MAC subPDU with L field has a bit length of 7 or 15 or 8 or 16 for the L field.

In a possible example, in the multiple MAC subPDUs, an MAC sub-header of an MAC subPDU with L field has a format of the first information field/R field of extension bits/the logical channel identifier LCID field/F field indicating a bit length format/L field indicating a length;

in the multiple MAC subPDUs, an MAC sub-header of an MAC subPDU without L field has a format of the first information field/the second information field/the LCID field.

When the processing unit 802 is a processor, the communication unit 803 is a communication interface, and the storage unit 801 is a memory, the transmitting device involved in the embodiment of the present application may be the network device shown in FIG. 6.

Figure 9:
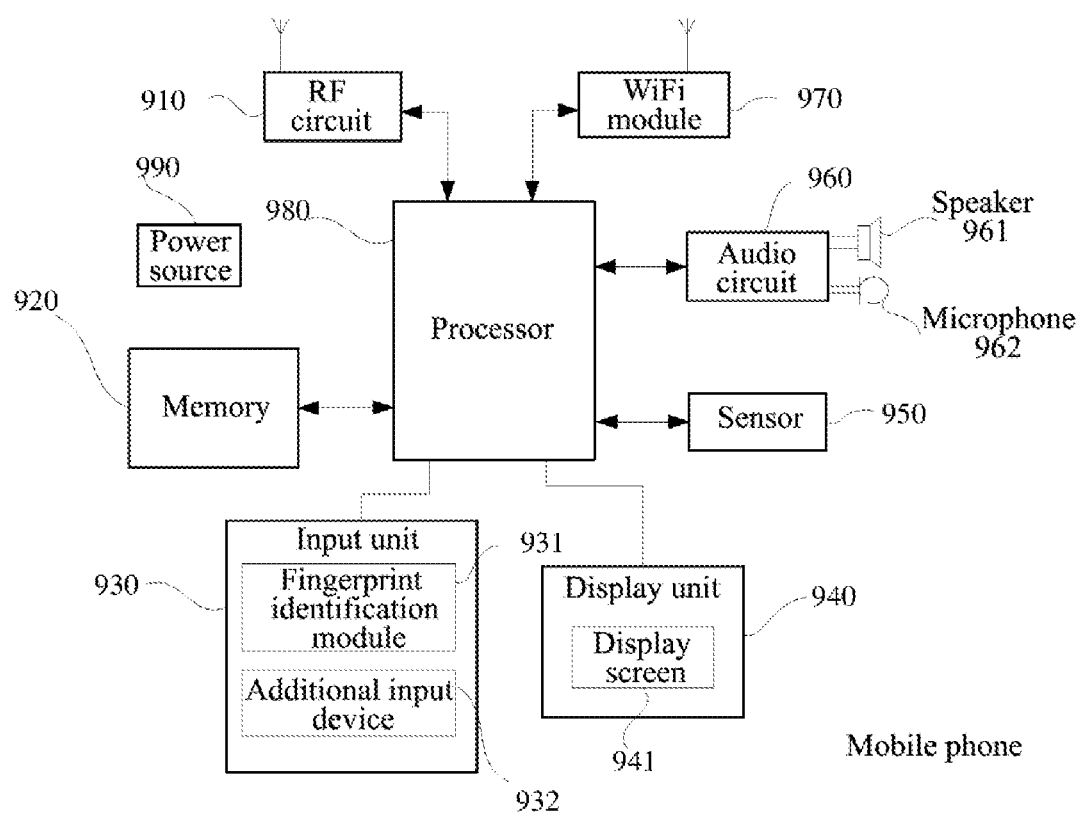
FIG. 9 is a schematic structural diagram of another terminal according to an embodiment of the present application.

An embodiment of the present application further provides another terminal. As shown in FIG. 9, for ease of description, only the portion related to the embodiments of the present application is shown. If specific technical details are not disclosed, please refer to the method portion in the embodiments of the present application. The terminal may be any terminal device including a mobile phone, a tablet computer, a PDA (Personal Digital Assistant), a POS (Point of Sales), and an on-board computer. Taking the mobile phone as an example of the terminal:

FIG. 9 shows a block diagram of a partial structure of a mobile phone related to the terminal provided in the embodiment of the present application. Reference may be made to FIG. 9, the mobile phone includes: a radio frequency (RF) circuit 910, a memory 920, an input unit 930, a display unit 940, a sensor 950, an audio circuit 960, a wireless fidelity (WiFi) module 970, a processor 980, a power source 990 and other components, Persons skilled in the art will appreciate that the structure of the mobile phone shown in FIG. 9 does not limit the mobile phone, but may include more or less components than those illustrated, or some components may be combined, or different components may be arranged.

The components of the mobile phone will be described hereunder in detail with reference to FIG. 9.

The RF circuit 910 may be configured to receive and transmit information. Generally, the RF circuit 910 includes, but is not limited to, an antenna, at least one amplifier, a transceiver, a coupler, a Low Noise Amplifier (LNA), a duplexer, and the like, in addition, the RE circuit 910 may also communicate with a network and a further device via wireless communications. The above wireless communications may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 920 may be configured to store software programs and modules; the processor 980 executes various functional applications and data processing of the mobile phone by running the software programs and the modules stored in the memory 920. The memory 920 may mainly include a program storage area and a data storage area, where the program storage area may be stored with an operating system, an application required for at least one function, and the like; the data storage area may be stored with data created according to the use of the mobile phone, and the like. Furthermore, the memory 920 may include a high speed random access memory, and may also include a nonvolatile memory such as at least one magnetic disk storage device, a flash memory device, or other volatile solid state storage device.

The input unit 930 may be configured to receive input numeric or character information, and generate key signal inputs related to user settings and function control of the mobile phone. Specifically, the input unit 930 may include a fingerprint identification module 931 and an additional input device 932. The fingerprint identification module 931 may collect fingerprint data thereon by a user, in addition to the fingerprint identification module 931, the input unit 930 may further include the additional input device 932. Specifically, the additional input device 932 may include, but is not limited to, one or more of a touch screen, a physical keyboard, a function key (such as volume control buttons, switch buttons, etc.), a trackball, a mouse, a joystick, and the like.

The display unit 940 may be configured to display information input by the user or information provided to the user as well as various menus of the mobile phone. The display unit 940 may include a display screen 941. In an implementation, the display screen 941 may be configured in a form of Liquid Crystal Display (LCID), Organic Light-Emitting Diode (OLED), or the like, Although in FIG. 9, the fingerprint identification module 931 and the display screen 941 function as two independent components to implement input and paly functions of the mobile phone, in some embodiments, the fingerprint identification module 931 and the display screen 941 may be integrated to implement input and play functions of the mobile phone.

The mobile phone may further include at least one type of sensor 950, such as a light sensor, a motion sensor, and other sensors. Specifically, the light sensor may include an ambient light sensor and a proximity sensor, where the ambient light sensor can adjust the brightness of the display screen 941 according to the brightness of the ambient light, and the proximity sensor can turn off the display screen 941 and/or backlight when the mobile phone moves in proximity to ears. As a type of motion sensor, an accelerometer sensor can detect the magnitude of acceleration in all directions (usually three axes), and can detect the magnitude and direction of gravity at rest, it can be used to identify applications of a gesture of the mobile phone (such as horizontal and vertical screen switching, related games, magnetometer attitude calibration), vibration recognition related functions (such as a pedometer, a tap), etc.; for other sensors such as a gyroscope, a barometer, a hygrometer, a thermometer, an infrared sensor, and the like configurable in the mobile phone, they will not be described herein for the sake of redundancy.

The audio circuit 960, a speaker 961, and a microphone 962 may provide an audio interface between the user and the mobile phone. The audio circuit 960 may transmit, to the speaker 961, the received electric signal converted from audio data, and the speaker 961 converts it to a sound signal for playing; on the other hand, the microphone 962 converts the collected sound signal into an electric signal, which is received by the audio circuit 960 and then converted into audio data, and then the audio data is played for processing by the processor 980, and is transmitted to, for example, another mobile phone via the RF circuit 910, or the audio data is stored to the memory 920 for further processing.

WiFi belongs to a short-range wireless transmission technology, according to which the mobile phone may help users to transmit and receive emails, browse web pages, and access streaming media through the WiFi module 970, and it provides the users with wireless broadband Internet access. Although the WiFi module 970 is shown in FIG. 9, it can be understood that it does not belong to an essential configuration of the mobile phone, and can be omitted as approximate within the scope of not changing the essence of the present disclosure.

The processor 980 is a control center of the mobile phone, which connects various parts of the entire mobile phone by using various interfaces and lines, and executes various functions and processing data of the mobile phone by running or executing software programs and/or modules stored in the memory 920 as well as invoking data stored in the memory 920, thereby monitoring the mobile phone integrally. In an implementation, the processor 980 may include one or more processing units; preferably, the processor 980 may integrate an application processor and a modem processor, where the application processor mainly handles operating systems, user interfaces, applications, etc., and the modem processor mainly handles wireless communications. It can be understood that the above modem processor may not be integrated into the processor 980.

The mobile phone further includes the power source 990 (such as a battery) that supplies power to the various components. Preferably, the power source may be logically coupled to the processor 980 through a power management system so that management of functions such as charging, discharging, and power consumption management is implemented through the power management system.

Although not shown, the mobile phone may further include a camera, a Bluetooth module, etc., and details will not be described herein again.

In the foregoing embodiments shown in FIG. 2A to FIG. 4, the flow on the terminal side in each step of the method may be implemented based on the structure of the mobile phone.

In the foregoing embodiments shown in FIG. 4 and FIG. 5, functions of each unit may be implemented based on the structure of the mobile phone.

An embodiment of the present application further provides a computer readable storage medium having stored thereon a computer program for electronic data exchange, where the computer program causes a computer to perform part of or all of steps for the terminal that are described in the forgoing method embodiment.

An embodiment of the present application further provides a computer readable storage medium having stored thereon a computer program for electronic data exchange, where the computer program causes a computer to perform part of or all of steps for the network device that are described in the forgoing method embodiment.

An embodiment of the present application further provides a computer program product including a non-transitory computer readable storage medium stored with a computer program, where the computer program is operable to cause a computer to perform part of or all of steps for the terminal that are described in the forgoing method embodiment. The computer program product may be a software installation package.

An embodiment of the present application further provides a computer program product including a non-transitory computer readable storage medium stored with a computer program, where the computer program is operable to cause a computer to perform part of or all of steps for the network device that are described in the forgoing method embodiment. The computer program product may be a software installation package.

The method or algorithm steps described in the embodiments of the present application may be implemented by hardware, or may be implemented by a processor executing software instructions. The software instructions may consist of corresponding software modules, which may be stored in a random access memory (RAM), a flash memory, a read only memory (ROM), an erasable programmable read only memory (EPROM), an electrically erasable programmable read only memory (EEPROM), a register, a hard disk, a mobile hard disk, a compact disk read only memory (CD-ROM) or any other form of storage medium known in the art. An exemplary storage medium is coupled to the processor to enable the processor to read information from, and write information to, the storage medium. Of course, the storage medium may also be an integral part of the processor. The processor and the storage medium may be located in an ASIC. Additionally, the ASIC may be located in an access network device, a target network device, or a core network device. Of course, the processor and the storage medium may also exist as discrete components in the access network device, the target network device, or the core network device.

It should be known to persons skilled in the art that, in one or more of the above examples, the functions described in the embodiments of the present application may be implemented integrally or partially by software, hardware, firmware, or any combination thereof. When implemented using the software, they may be implemented integrally or partially in a form of computer program product. The computer program product includes one or more computer instructions. When the computer program instructions are loaded and executed on a computer, the processes or functions described in accordance with the embodiments of the present application are generated integrally or partially. The computer may be a general purpose computer, a special purpose computer, a computer network, or other programmable device. The computer instructions may be stored in a computer readable storage medium or transferred from one computer readable storage medium to another computer readable storage medium, fix example, the computer instructions may be transferred from one website, computer, server or data center to another website, computer, server, or data center in a wired (e.g., coaxial cables, optic fibers, digital subscriber lines (DSL)) or wireless (e.g., infrared, radio, microwave, etc.) manner. The computer readable storage medium may be any available medium that can be accessed by a computer or a data storage device such as an integrated server, data center, or the like that includes one or more available media. The available medium may be a magnetic medium (such as a floppy disk, a hard disk, and a magnetic tape), an optical medium (such as a digital video disc (DVD)), a semiconductor medium (such as a solid state disk (SSD)), or the like.

The objectives, the technical solutions and the beneficial effects of the embodiments of the present application have been described in detail in the specific implementations described above. It should be understood that the foregoing description is only specific implementations of the embodiments of the present application, but is not intend to limit the scope of protection of the embodiments of the present application. Any modifications, equivalent replacements, and improvements made based on the technical solutions of the embodiments of the present application should be included in the scope of protection of the embodiments of the present application.

What is claimed is:

1. A data transmission method, comprising:
receiving, by a receiving end, a data packet from a transmitting end, wherein the data packet comprises a media access control (MAC) protocol data unit (PDU), and the MAC PDU comprises multiple MAC subPDUs, each of which comprises a MAC sub-header;
wherein the MAC sub-header comprises a first information field used for indicating whether a current MAC subPDU has a same format as a next adjacent MAC subPDU;
in the multiple MAC subPDUs, a MAC sub-header of a MAC subPDU without an L field indicating a length comprises a second information field and a logical channel identifier (LCID) field, wherein the second information field is used for indicating whether the LCID field is read at the receiving end.

2. The method according to claim 1, wherein the second information field is located in a second bit of the MAC sub-header.

3. The method according to claim 1, wherein the first information field is located in a first bit of the MAC sub-header.

4. The method according to claim 1, wherein in the multiple MAC subPDUs, a MAC subPDU with the L field has a bit length of 7 or 15 or 8 or 16 for the L field.

5. The method according to claim 1, wherein in the multiple MAC subPDUs, a MAC sub-header of a MAC subPDU with the L field has a format of the first information field/R field of extension bits/the LCID field/F field indicating a bit length format/the L field;

in the multiple MAC subPDUs, the MAC sub-header of the MAC subPDU without the L field has a format of the first information field/the second information field/ the LCID field.

6. A terminal, comprising a processor, a memory, a communication interface, and one or more programs, wherein the one or more programs are stored in the memory and configured to be executed by the processor, and the program comprises instructions for performing the following step:

receiving a data packet from a transmitting end, wherein the data packet comprises a media access control (MAC) protocol data unit (PDU), and the MAC PDU comprises multiple MAC subPDUs, each of which comprises a MAC sub-header;

wherein the MAC sub-header comprises a first information field used for indicating whether a current MAC subPDU has a same format as a next adjacent MAC subPDU;

in the multiple MAC subPDUs, a MAC sub-header of a MAC subPDU without an L field indicating a length comprises a second information field and a logical channel identifier (LCID) field, wherein the second information field is used for indicating whether the LCID field is read at a receiving end.

7. The terminal according to claim 6, wherein the second information field is located in a second bit of the MAC sub-header.

8. The terminal according to claim 6, wherein the first information field is located in a first bit of the MAC sub-header.

9. The terminal according to claim 6, wherein in the multiple MAC subPDUs, a MAC subPDU with the L field has a bit length of 7 or 15 or 8 or 16 for the L field.

10. The terminal according to claim 6, wherein in the multiple MAC subPDUs, a MAC sub-header of a MAC subPDU with the L field has a format of the first information field/R field of extension bits/the LCID field/F field indicating a bit length format/the L field;

in the multiple MAC subPDUs, the MAC sub-header of the MAC subPDU without the L field has a format of the first information field/the second information field/ the LCID field.

11. A network device, comprising a processor, a memory, a transceiver, and one or more programs, wherein the one or more programs are stored in the memory and configured to be executed by the processor, and the program comprises instructions for performing the following step:

transmitting a data packet, wherein the data packet comprises a medium access control (MAC) protocol data unit (PDU), and the MAC PDU comprises multiple MAC subPDUs, each of which comprises a MAC sub-header;

wherein the MAC sub-header comprises a first information field used for indicating whether a current MAC subPDU has a same format as a next adjacent MAC subPDU;

in the multiple MAC subPDUs, a MAC sub-header of a MAC subPDU without an L field indicating a length comprises a second information field and a logical channel identifier (LCID) field, wherein the second information field is used for indicating whether the LCID field is read at a receiving end.

12. The network device according to claim 11, wherein the second information field is located in a second bit of the MAC sub-header.

13. The network device according to claim 11, wherein the first information field is located in a first bit of the MAC sub-header.

14. The network device according to claim 11, wherein in the multiple MAC subPDUs, a MAC subPDU with the L field has a bit length of 7 or 15 or 8 or 16 for the L field.

15. The network device according to claim 11, wherein in the multiple MAC subPDUs, a MAC sub-header of a MAC subPDU with the L field has a format of the first information field/R field of extension bits/the LCID field/F field indicating a bit length format/the L field;

in the multiple MAC subPDUs, the MAC sub-header of the MAC subPDU without the L field has a format of the first information field/the second information field/ the LCID field.

16. A non-transitory computer readable storage medium having stored thereon a computer program for electronic data exchange, wherein the computer program causes a computer to perform the method according to claim 1.

17. A non-transitory computer readable storage medium having stored thereon a computer program for electronic data exchange, wherein the computer program causes a computer to perform the step in claim 11.

\* \* \* \* \*